Feb. 22, 1938.    J. C. RUMSEY    2,108,868
CHARIOT VEHICLE
Filed Oct. 28, 1935

INVENTOR.
John C. Rumsey,
BY
ATTORNEY.

Patented Feb. 22, 1938

2,108,868

UNITED STATES PATENT OFFICE 2,108,868

CHARIOT VEHICLE

John C. Rumsey, Lawrence, Kans., assignor to The Rumsey Junior Vehicle Company, Lawrence, Kans., a corporation of Kansas Application October 28, 1935, Serial No. 47,105

5 Claims. (Cl. 280—1.16)

The present invention relates to vehicles, particularly of the class used by juveniles, and aims to provide a novel and improved vehicle construction of the self-propelled type.

A primary object of the invention therefore is to provide a vehicle of this class in which conveniently operated tread means is provided for producing the propelling motion of the vehicle, together with appropriate means whereby the tread motion is utilized to actuate a figure simulating the head portion of an animal for the purpose of causing the figure to execute life-like motions characteristic of such animal.

It is also sought to devise a chariot type of vehicle having propelling means of the character just indicated, with one or more animal figures forming a part of the construction and adapted to have an animated effect imparted thereto by such propelling means.

More specifically the invention comprises a chariot design of vehicle with a pair of tread-operated means, for both feet of the rider, with a pair of animal figures oppositely actuated by said tread means, for producing the desired simulation of the characteristic movements of such animals.

It is further sought to provide a construction of attractive design as well as convenient in its operation both for propelling purposes and also for effecting the required steering of the vehicle.

With the foregoing general objects in view the invention will now be described with reference to the accompanying drawing showing a form of construction adapted for the appropriate carrying out of the purposes of the proposed improvements, after which those features and combinations deemed to be novel and patentable will be particularly set forth and claimed.

In the drawing—

Figure 1:
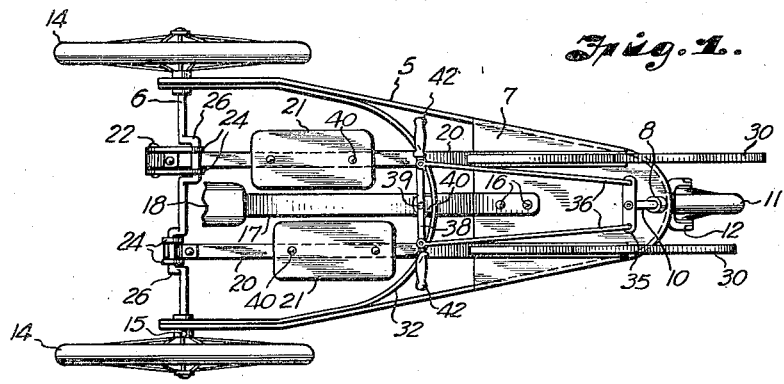
Figure 1 is a plan view showing a vehicle embodying the proposed improvements.
Figure 2:
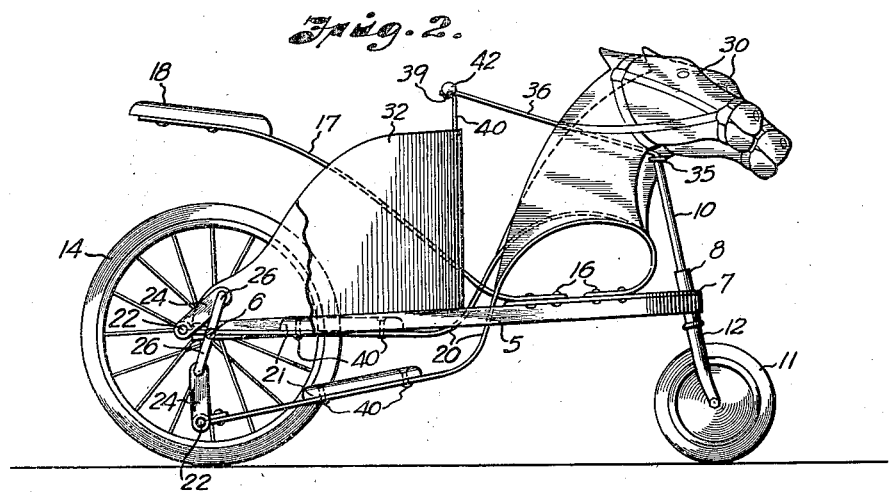
Figure 2 is a side elevation of the same.

Referring now to the drawing in detail, the form of construction shown comprises a frame member 5 of approximately V-form provided with bearings at its rear end for the propelling axle 6, and a plate or platform 7 at its front end where a suitable bearing 8 is provided for a steering post 10,—see Figures 1 and 2. A front or rear wheel 11 is mounted in a fork 12 at the lower end of said post, and a pair of rear wheels 14 are mounted on the ends of the axle 6, and either or both of said wheels 14 secured to the axle, though I find it practicable to key but one of them to the axle (see Figures 1 and 3), leaving the other one free for better execution of turning movements of the vehicle.

To the upper face of the plate or platform 7 is secured, as by rivets 16, the front ends of a set of springs, of appropriate size and strength, namely, a seat-supporting spring 17 extending upward and rearward and provided with a suitable seat or saddle 18 at its rear end, and also a pair of propelling springs 20 which are suitably bowed at their front ends above said plate 7, as clearly shown in Figure 2, and then extend downward and rearward into the vicinity of the axle 6. Each of said springs 20 carries a tread plate 21, and its rear end is pivotally secured by pin 22 and links 24 to a crank portion 26 of said axle, the two crank portions 26 being oppositely arranged with reference to said axle, for propelling purposes.

Upon the front or bowed portions of the springs 20 are mounted figures 30 each simulating the head portion of an animal, which figures are thus positioned at the sides of the steering post and steering wheel 11, and obviously mounting said figures 30 upon the springs 20 causes these figures to be actuated by any motion taking place in said springs, as hereinafter described.

Figure 3:
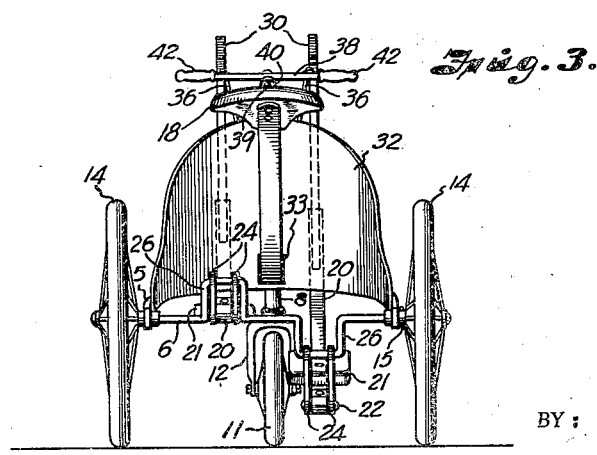
Figure 3 is a rear elevation.

In order to give the structure the appearance of a chariot-form of vehicle, a vertical shield or apron member 32 is mounted upon the frame 5, in position extending from a point forward of the tread members 21 to the sides of said frame and thence to the opposite ends of the axle 6, as clearly shown in Figure 1. A suitable opening 33 is provided in the lower front margin of said apron member 32 for passage of the supporting spring 17, as shown in Figure 3. The other springs 20 extend downwardly sufficiently to clear said lower margin of the apron member 32.

Secured to the upper end of the steering post 10 is a plate 35, the opposite ends of which are pivotally connected by means of links 36 to opposite end portions of a steering arm 38 which is pivoted at 39 to the upper end of a bracket arm 40 mounted on the upper margin of the shield or apron member 32. The ends of the arm 40 are equipped with suitable hand grips 42.

In the operation of the above described construction it will be seen that the rider being seated upon the saddle 18 may actuate the tread plates 21 in alternating fashion to propel the vehicle by rotation of the cranks 26 of the axle, at the same time appropriately steering the vehicle by means of the steering arm 38 and its connections to the post 10. Obviously the movement of the spring 29 in this propelling operation produces a certain degree of up and down movement of the front or bowed portions of the springs carrying the figures 30, the result of which is of course to impart an alternating oscillating motion to said figures, in simulation of the characteristic movements of the animals they represent, as long as the vehicle is in motion or being propelled.

Thus an extremely diverting toy construction is provided which is both practical and simple, as well as convenient and easy to operate, and the appearance of which is such as to simulate a chariot-form of vehicle, with the animated figures representing horses drawing the same.

The construction is not only inexpensive, but strong and durable, with practically nothing to get out of order, and while I have shown and described what I now regard as the preferred form of construction for embodying the proposed improvements, I desire to be understood as reserving the right to make whatever changes or modifications may fairly fall within the scope of the appended claims.

What I claim is:

1. A vehicle of the character described comprising a frame provided with a propelling wheel, a tread-operated spring having its front end formed with an upwardly bowed portion and its rear end provided with an operative drive connection to said propelling wheel, and a figure simulating an animal carried by the upwardly bowed portion of said spring.

2. A vehicle of the character described comprising a frame provided with a propelling wheel, a pair of tread-operated springs provided with alternately operating drive connections to said propelling wheel, and a figure simulating an animal carried by a moving portion of each of said springs.

3. A vehicle of the character described comprising a frame provided with a propelling wheel, a tread-operated spring having an upwardly bowed portion secured to the front end portion of said frame, the remainder of said spring extending downwardly and rearwardly and provided with an operative drive connection to said propelling wheel, and a figure simulating an animal mounted upon the front bowed portion of said spring.

4. A vehicle of the character described comprising a frame provided with a propelling wheel, a tread-operated spring provided with an operative drive connection to said propelling wheel, a figure simulating an animal carried by a moving portion of said spring, and an upright apron simulating a chariot shield carried by the rear portion of said frame and enclosing the space above the tread-operated portion of said spring.

5. A vehicle of the character described comprising a frame provided with a propelling wheel, a pair of tread-operated springs provided with alternately operating drive connections to said propelling wheel, a figure simulating an animal carried by a moving portion of each of said springs, and an upright apron simulating a chariot shield carried by the rear portion of said frame and enclosing the space above the tread-operated portions of said springs.

JOHN C. RUMSEY.